(12) United States Patent
Perry

(10) Patent No.: US 12,007,051 B2
(45) Date of Patent: Jun. 11, 2024

(54) CONDUIT SUPPORT DEVICE

(71) Applicant: Shawn Perry, Winnipeg (CA)

(72) Inventor: Shawn Perry, Winnipeg (CA)

( * ) Notice: Subject to any disclaimer, the term of this patent is extended or adjusted under 35 U.S.C. 154(b) by 394 days.

(21) Appl. No.: 17/400,030

(22) Filed: Aug. 11, 2021

(65) Prior Publication Data

US 2022/0049795 A1 Feb. 17, 2022

Related U.S. Application Data

(60) Provisional application No. 63/066,222, filed on Aug. 15, 2020.

(51) Int. Cl.
*F16L 3/10* (2006.01)

(52) U.S. Cl.
CPC ...................... *F16L 3/10* (2013.01)

(58) Field of Classification Search
CPC ....... F16L 3/10; F16L 3/18; F16L 3/04; F16L 3/1091; F16L 3/223; F16L 51/00; H02G 9/04; H02G 3/34
See application file for complete search history.

(56) References Cited

U.S. PATENT DOCUMENTS

| | | | | |
|---|---|---|---|---|
| 949,576 | A * | 2/1910 | Hunter | F16L 3/00 248/57 |
| 1,470,485 | A * | 10/1923 | De Rouen | F16L 55/178 285/337 |
| 3,538,940 | A * | 11/1970 | Graham | F16K 27/00 285/305 |
| 5,649,632 | A * | 7/1997 | Terashima | F16L 3/2235 248/68.1 |
| 5,992,802 | A * | 11/1999 | Campbell | H02G 3/30 248/68.1 |
| 6,520,456 | B1 * | 2/2003 | Neider | F16L 3/01 248/65 |
| 2002/0117850 | A1 * | 8/2002 | Wood | F16L 39/00 285/305 |
| 2003/0089829 | A1 * | 5/2003 | Brandzel | F16L 3/222 248/68.1 |
| 2010/0123048 | A1 * | 5/2010 | Pollard, Jr. | F16L 3/2235 248/49 |
| 2013/0207379 | A1 * | 8/2013 | Meissner | F16L 3/11 285/64 |
| 2016/0340907 | A1 * | 11/2016 | Bond | B26F 3/02 |

* cited by examiner

*Primary Examiner* — Patrick C Williams

(57) ABSTRACT

A conduit supporting device used to support a conduit at one or more than one location on said device, and where the device can support and receive one or more than one conduit. The device may placed, set on or affixed to a surface such as a roof, floor, pipe rack, production area, on the ground and other conventional locations where a need exists for conduit support.

27 Claims, 11 Drawing Sheets

CONDUIT SUPPORT DEVICE

CROSS-REFERENCE TO RELATED APPLICATIONS

This application claims priority to provisional U.S. Application No. 63/066,222 filed Aug. 15, 2020.

FIELD OF INVENTION

The present invention is in the field of pipe, conduit and wire support.

BACKGROUND OF THE INVENTION

It is well known that conduits are used to convey hydrocarbon fuels, inert gases, steam, water, refrigerants, oil, condensate, and electricity. These conduits are commonly placed on roof surfaces, in mechanical rooms, plant production areas, on the ground or similar to the above areas. Typically, these conduits have components that join two or more conduits together such as couplings, 90-degree fittings, T fittings, junction boxes, or components that perform a function as part of the system such as a meter, valve or regulator.

Gas, plumbing, building and electrical codes stipulate that such conduits or components be supported in a manner that will not create a hazard or place undue stress to the conduit system.

As the population increases and technology continues to advance exponentially buildings such as, but not limited to, manufacturing plants, recreation facilities, universities, schools and shopping malls become larger and more complex. These larger facilities require conduit systems of more complexity to supply, control and regulate the performance and load demands of each conduit system. These larger complex conduit systems typically have many components such as but not limited to flow control devices, meters, valve stations, relieving devices and pumps which are installed for controlling a fuel, gas, liquid or power conveyed by a conduit. With increased number of controls and components of the conduit system more risk is created due to the number of joints or connections within the conduits.

Prior art such as Rook U.S. Pat. No. 9,528,271; Brown U.S. Pat. No. 9,523,380; Birli U.S. Pat. No. 8,356,778; Krovates U.S. Pat. No. 8,312,692; Hawkins U.S. Pat. No. 7,922,130, and others provide some means for supporting a conduit. While each of the above patents provides value and teaching for supporting a conduit above a surface, they lack in fundamental engineering principles for today's conduit support. With technological advancements in building automation, appliances, conduit materials and methods of joining conduits coupled with the complexity of today's conduit systems, prior art could not possibly realize the need for advanced conduit supporting means and methods.

Despite prior art improvements of material, as cited by prior art for each of the above U.S. Patents the basic idea of the wooden block fundamentally has not changed and provides the same conduit support at one location without accountability for complex conduit systems. Forward looking, with the use of wood preservatives, wooden blocks do not breakdown in the same manner as traditional untreated wooden blocks. Regardless of materials, current conduit supports still consist of the single block type support which does not equally support a conduit at critical locations.

What is needed is a conduit support block that provides more than one conduit support area on a single support. This is of particular importance in systems where threaded or grooved ends of conduits have removed base metals in the process of threading or grooving, in systems where attachments of components are glued or attached with screws or connectors or in complex conduit systems which have regulating, controlling or relief devices.

As mentioned, large conduit systems typically have many components which are required to be protected from stress and damages. While single contact supports such as wooded, rubber, plastic or similar blocks may be used to provide the support of a conduit, they are typically not placed at critical areas of conduit weakness such as component locations, conduit ends or joints. Furthermore, if prior art support blocks were to be placed at conduit ends, component or joint locations more than one support would be required to support the component, conduit ends or joints. Not only is this expensive and labour intensive, often the supports are misplaced, incorrectly installed or moved to other locations over time during renovations, alterations or maintenance work.

The present invention overcomes issues not addressed in prior art including providing a single conduit support where a conduit, conduit ends and joints can be supported at one or more than one location on a single support.

SUMMARY OF THE INVENTION

According to one aspect of the present invention there is a primary objective to provide a conduit support that overcomes issues not addressed by prior art which includes; providing a single conduit support with one or more support and/or attachment area for a conduit wherein more than one conduit end or joint can be supported on one conduit support. Additionally, to provide a conduit support in which a component of the conduit system can be placed or retained generally center of the conduit support.

Accordingly, the present invention provides a conduit support that supports conduits and conduit ends at changes of direction such as 90-degree turns, 45 degree turns, parallel and perpendicular turns (tee fittings) (cross t fittings) or Y fittings or similar to the above.

The present invention is a resilient conduit support which provides one or more than one conduit point of contact on a single support where a conduit can be supported and/or affixed in one or more locations on the single conduit support providing conduit and component protection from stress, strain, breakage or similar.

One embodiment of the present invention is a generally square or rectangular shaped support which has a base or bottom that extents upwardly to a top surface that may have different elevations relative to the position of a component of the conduit. However, other geometrically shaped support blocks are to be considered including circular, triangular and hexagon shapes which may be a combination of or any geometrical shape.

Other support blocks may include a flat top four-sided pyramid, cone, or flat top conical eight-sided shapes where the bottom perimeter is larger in diameter than the top perimeter.

A preferred support block may be made of non-metallic elastomeric, rubber or plastic material or similar, which can be made of recycled material, which may have other elements built within, such as marking, labelling, or lighting areas.

The support block may have holes penetrating or passing directly through the support block where other conduits or electrical wiring can be fed or inserted through. Additionally, conduit attachment areas may be formed within the sides of the support block.

The top of the support block will have one or more than one area for a conduit to be supported equally distributing weight loads thus adapted to support light, medium and heavy loads with equal respect. Additionally, with a support block of durable and resilient material it is long lasting as load bearing factors do not fatigue, stress or strain the support block. Furthermore, the support block is well suited for harsh climates and conditions which include load bearing forces of snow or human foot traffic.

The footprint or load distribution of the support block is suited for installation on synthetic rubber EPDM, polyvinyl chloride PVC, thermoplastic polyolefin TPO, metal, asphalt, tar, roof surfaces covered in rocks or similar roofing membranes or materials.

Other advantages formed in part or in whole of the bottom or base of the support block are channels or passages which prevent temperature transfer from a conduit to roof or vice versa. Additionally, the channels or passages also allow watershed preventing standing water, condensate or similar at the support block.

Yet another advantage of the bottom or base is a base lower lip which allows roofing membranes to be overlapped preventing water penetration through the roofing material; this is of particular importance when a conduit support must be fastened to a roof surface. In addition, to providing a water tight seal the base lower lip when overlapped with roofing materials secures the support block.

Accordingly, the lower lip of the base may have holes or placement markings for connector elements to be used to affix the support block to a surface. If provided with connector element holes the holes may be countersunk to allow for a smooth surface for roofing or other membranes to be laid flush.

The center top surface of the support block may be lower in elevation or completely void of material compared to the outermost perimeter conduit supporting areas. The lower area center of the perimeter support area may have vertical or horizontal holes or passages for air transfer, water drainage or similar.

These and other aspects of the present disclosure are described below and will be better understood when the following detailed description is read.

DETAILED DESCRIPTION

Embodiments of the invention will now be described with the use of the figures or illustrations. The use of numerical and or alphabetical reference may refer to similar components or parts throughout and repetition of descriptive writing may not necessarily be repeated. It is to be understood that illustrations and descriptions now disclosed including embodiments, components, configurations and materials are preferred and are given solely for explanation and understanding purposes. Therefore, it is to be understood that no limitation of the scope of the invention is thereby intended with the following descriptive writing or illustration.

Terminology used herein is for the purpose of describing embodiments only and is not intended to be limiting of the invention.

Terminology used herein is used for descriptive purpose, as such, the use of singular terms may include plural or plural may be singular where sense can be made.

The term "conduit" may refer to a conduit, pipe or tubing of any type, material, length, size, circumference or schedule and wire or cable of any type, material, length, circumference or gauge that conveys gas, liquid, dust, electricity or similar to these used in trade disciplines, such as, but not limited to plumbing, heating, fire protection, sprinkler fitting, gas fitting, steam fitting, pipe fitting, oil fitting, refrigeration, electrical, pneumatic and hydraulic.

The term "component" may refer to couplings, fittings, 90-degree elbows, T fittings, flanges, valves, regulators, unions, junction box's and other similar, related or associated mechanical parts, fittings or devices which may be attached into or used in conjunction with a conduit. The term also includes any fitting described in mechanical, plumbing, gas, building, and electrical codes and standards or codes and standards similar.

The term "support block" is to be understood as the invention, device, pipe support or conduit supporting device adapted to receive and support a conduit.

The use of terms is not intended to be limiting, as such, similar wording or terms which are known by those skilled in the art are to be considered within the scope of this disclosure.

Throughout this disclosure or writing it is to be understood that the invention could be used, installed or placed in or on a roof, floor, mechanical room, ground, and other conventional locations where a need exists for conduit support.

As described in the Background and illustrated in prior art FIG. 21, 22, 23, 24 current pipe and conduit supports illustrate locations for supporting a conduit without regard for support at the conduit ends.

Figure 4:
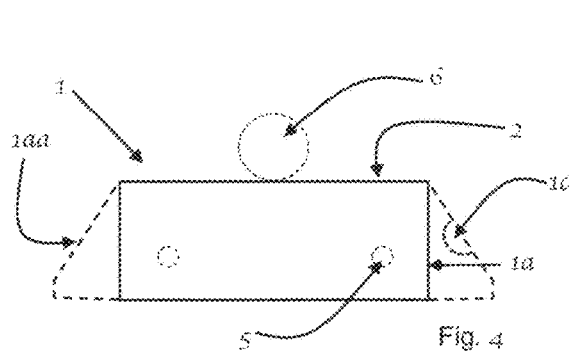
FIG. 4 is a side view of the support block of FIG. 1 which includes a conduit on the top.
Figure 24:
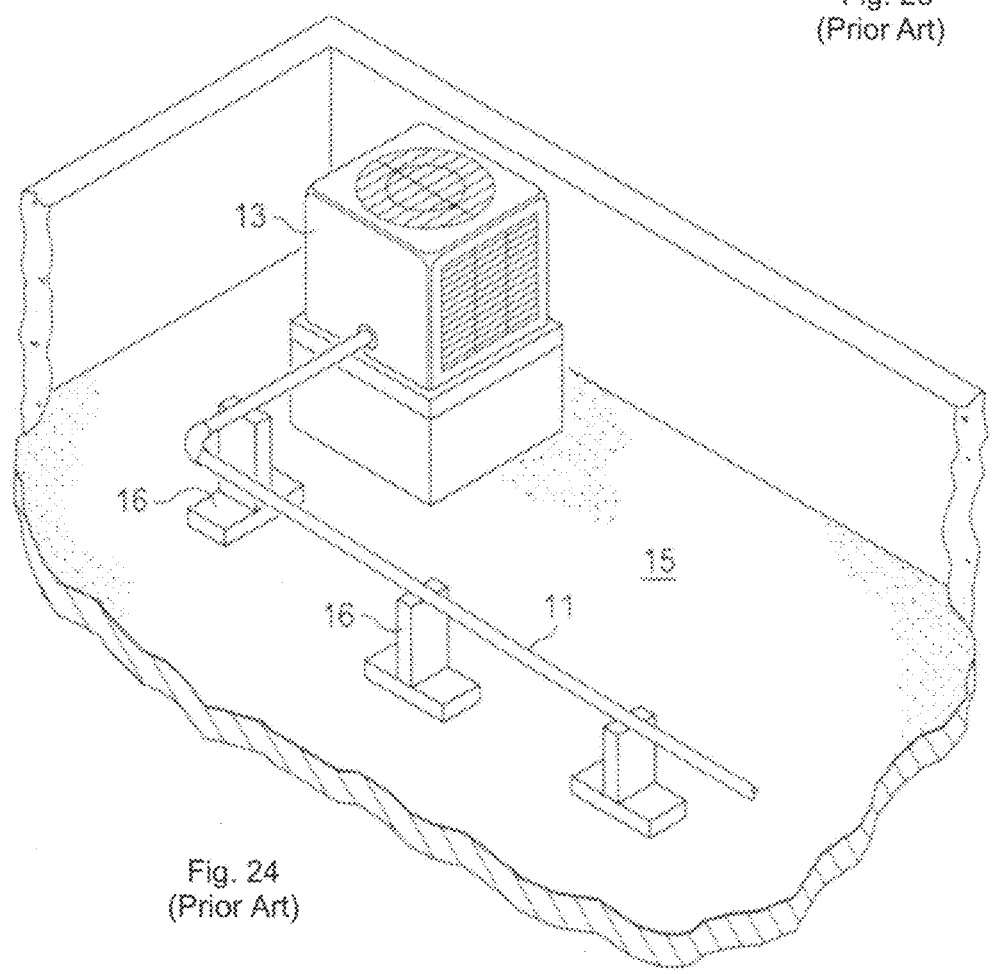
FIG. 24 is a perspective view of prior art supporting a conduit illustrating random placement of conduit supports without regard for supporting conduit ends where the conduit has no complex control.

To better understand the spirit of the invention reference of prior art illustration is provided illustrating traditional wooded blocks U.S. Pat. No. 9,523,380 by Brown FIG. 4 provided in FIG. 24 of this disclosure. Attention is now drawn to the positions of the wooden supports which appear randomly placed. In particular, the placement of the supports neglects supports on both sides of the 90-degree elbow (at conduit ends or joints). With this random positioning it becomes apparent the 90-degree elbow joints and conduit ends are not equally supported leaving one joint or conduit end unsupported and vulnerable to stress and breakage.

Figure 7:
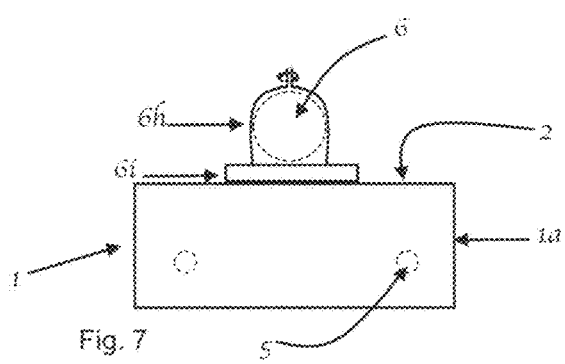
FIG. 7 is a side view of the support block of FIG. 1 which includes a conduit supported by u-channel on the support block.
Figure 21:
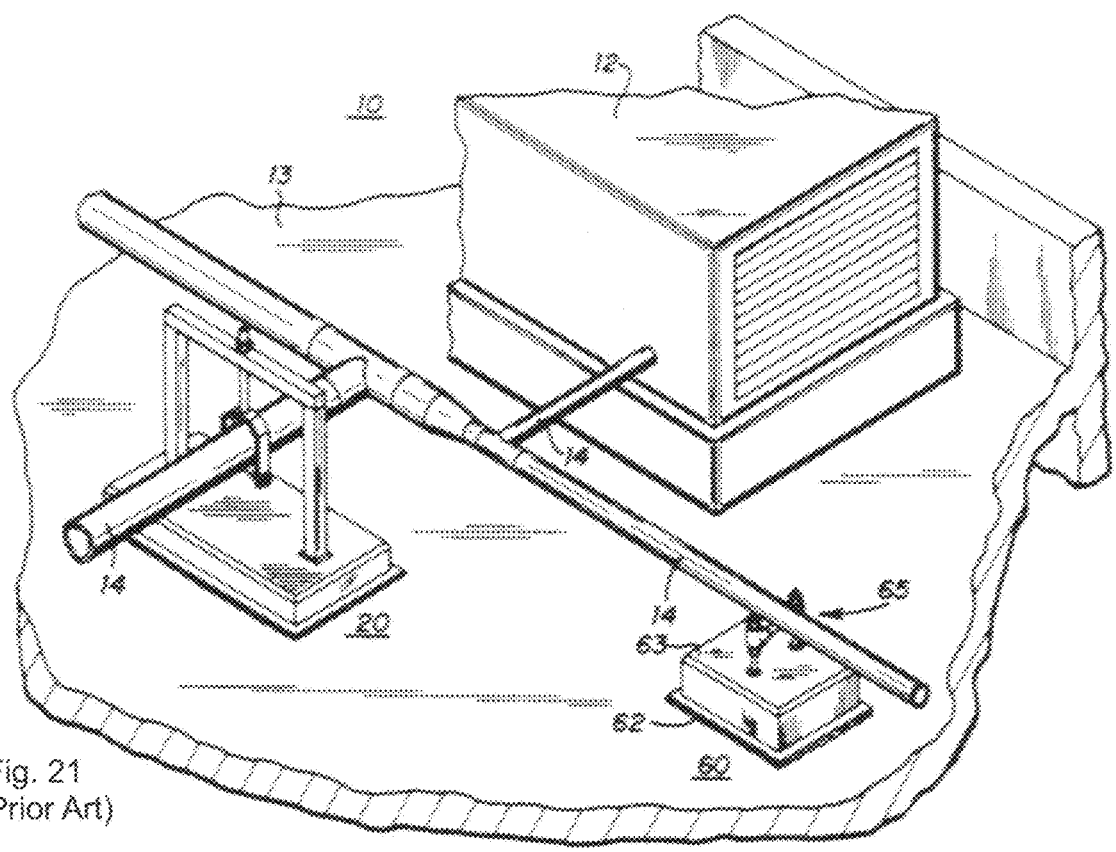
FIG. 21 is a perspective view of prior art supporting a conduit illustrating random placement of conduit supports without regard for supporting conduit ends where the conduit has no complex control.
Figure 22:
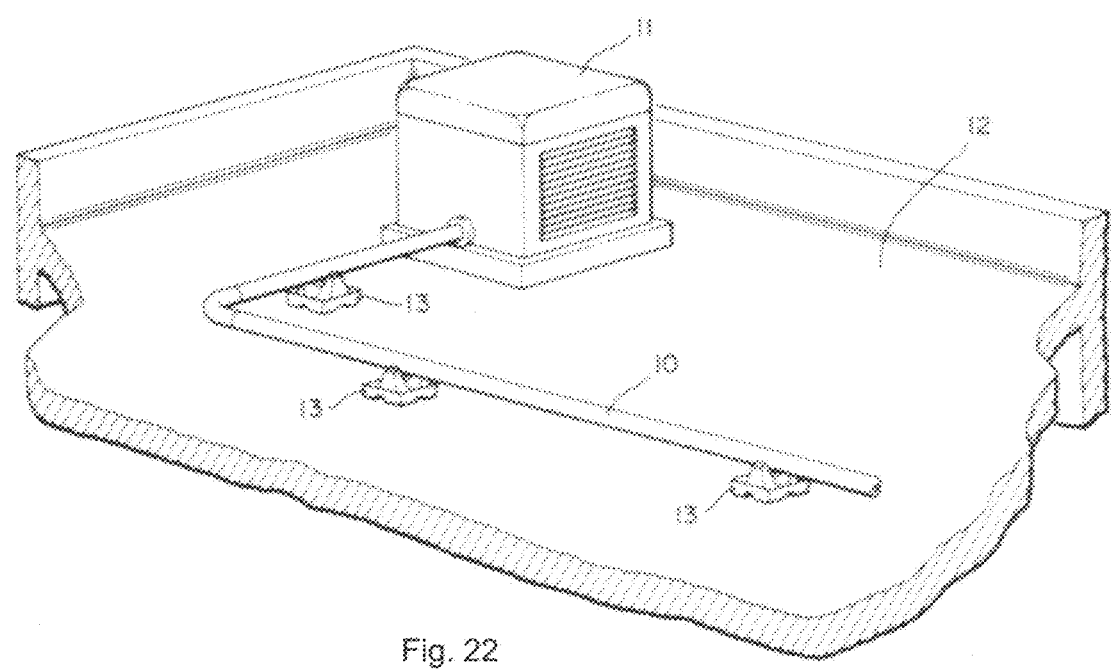
FIG. 22 is a perspective view of prior art supporting a conduit illustrating random placement of conduit supports without regard for supporting conduit ends where the conduit has no complex control.
Figure 23:
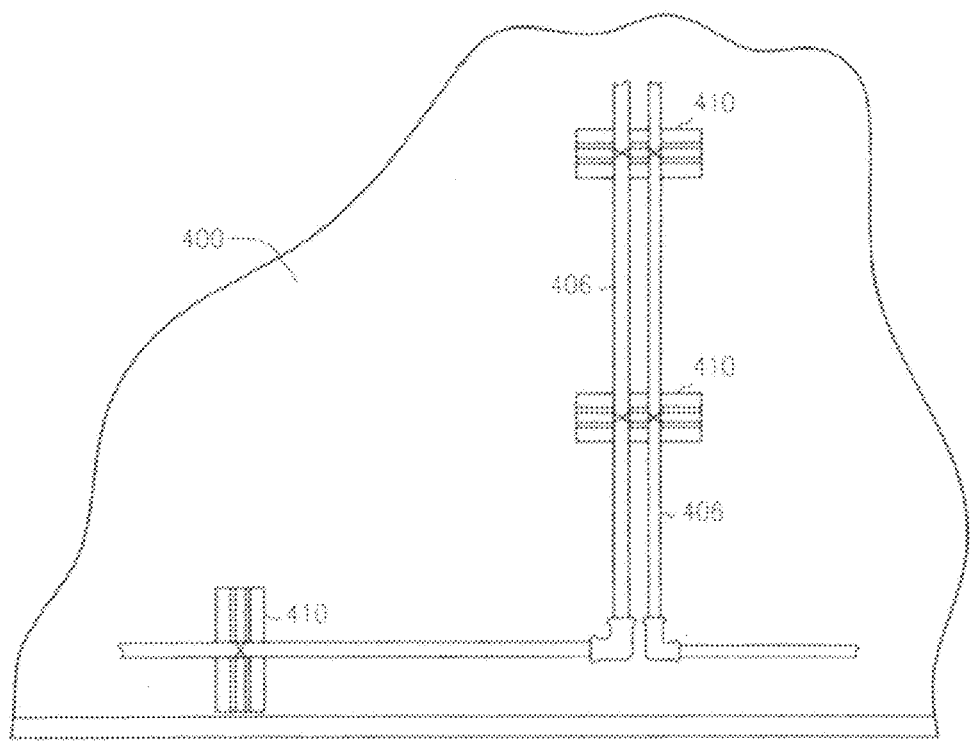
FIG. 23 is a top plan view of prior art illustrating conduits supported without regard for conduit end support at 90-degree changes of direction.

U.S. Pat. No. 7,922,130 by Hawkins provides prior art illustration in FIG. 7 illustrated in this disclosure as FIG. 23 of supports again randomly positioned without any supports at 90-degree elbows. FIG. 22 provides illustration of prior art U.S. Pat. No. 6,520,456 by Neider, U.S. Pat. No. 4,513,934 by Pruyne, U.S. Pat. No. 4,502,653 by Curtis Jr which illustrate conduit support placement where the supports are not placed at 90-degree elbows again providing no support for all conduit ends. FIG. 21 illustrates FIG. 1 of U.S. Pat. No. 5,217,191 by Smith where supports are not placed supporting T fittings or a reducing coupling further illustrating the need for all conduit ends to be supported.

Figure 25:
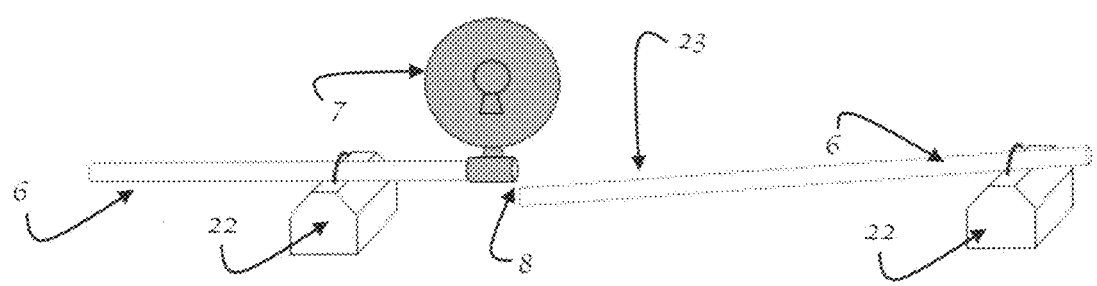
FIG. 25 is a perspective view illustrating prior art supports and a damaged conduit.

As described in the Background and illustrated in prior art examples shown in FIG. 21, 22, 23, 24 regardless of traditional wooden supports or other prior art it becomes apparent that current conduit or pipe supporting devices used today lack in providing support for conduits at the conduit ends where attachment is made to components, flanges or butt joints. Additionally, if placement was to be provided with single contact supports the number of such prior art supports 22 (FIG. 25) 20,60 (FIG. 21) 13 (FIG. 22) 410 (FIG. 23) 16 (FIG. 24) could triple, and as discussed in the Background this would be time consuming, very costly, wasteful and even impractical or impossible.

Figure 27:
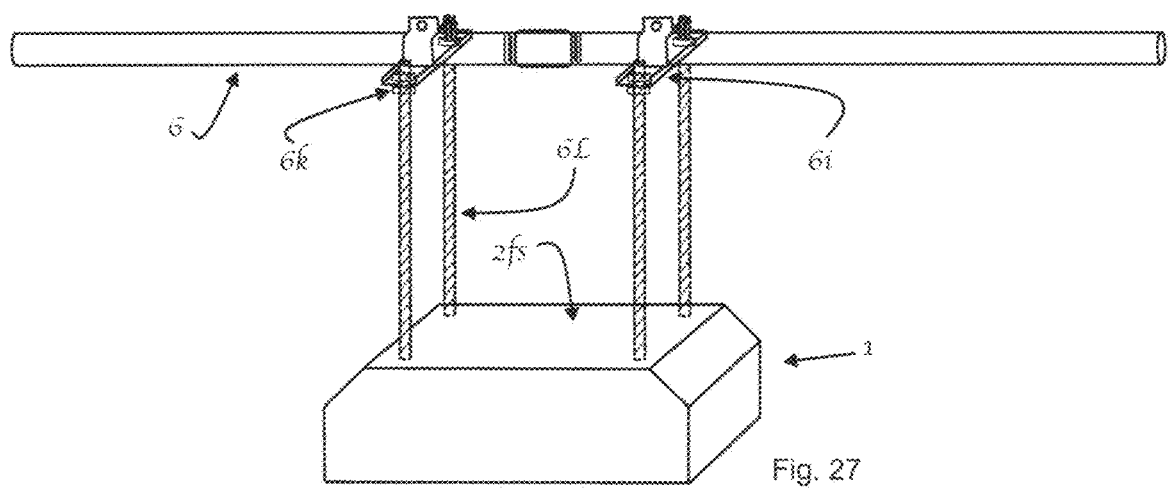
FIG. 27 is a perspective view illustrating a support block supporting a conduit elevated by threaded rod.
Figure 28:
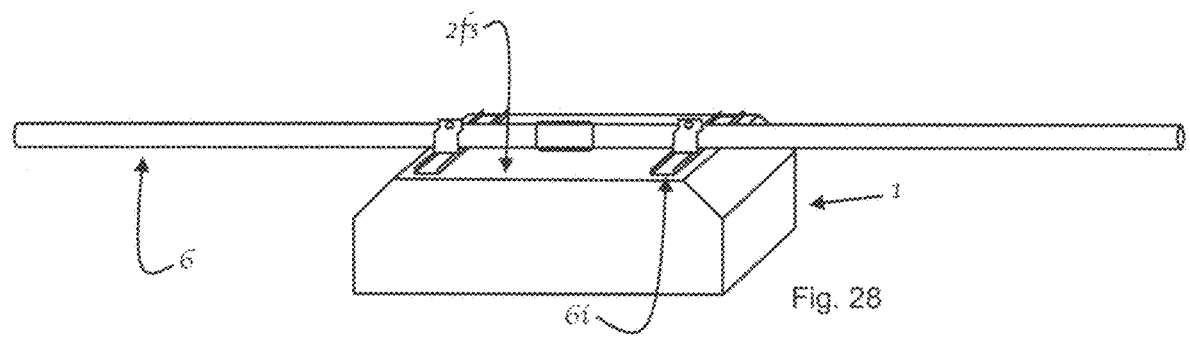
FIG. 28 is a perspective view illustrating a support block supporting a conduit with elongated channel placed between the conduit and the top of the support block.
Figure 29:
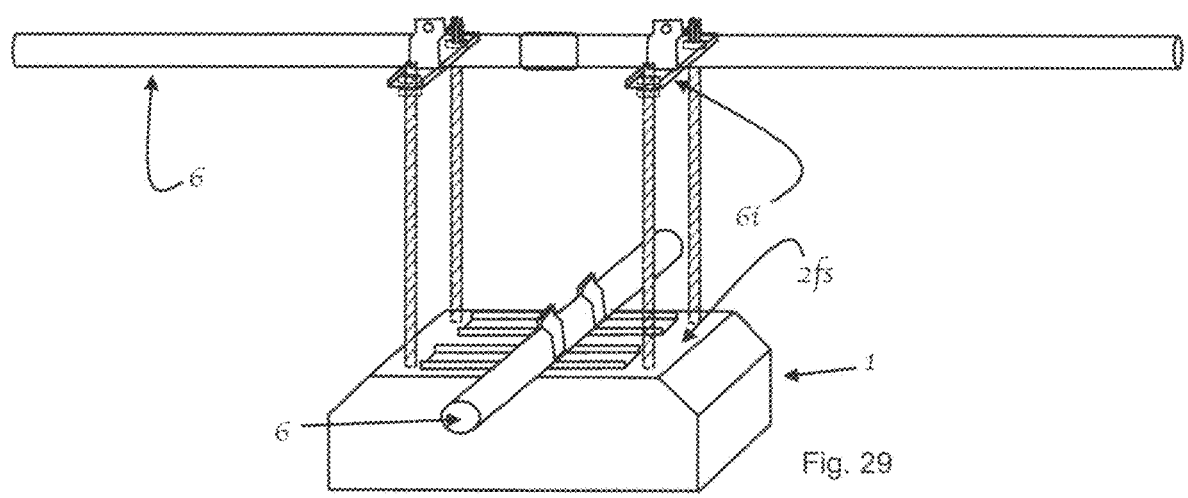
FIG. 29 is a perspective view illustrating conduits supported perpendicular to each other.
Figure 30:
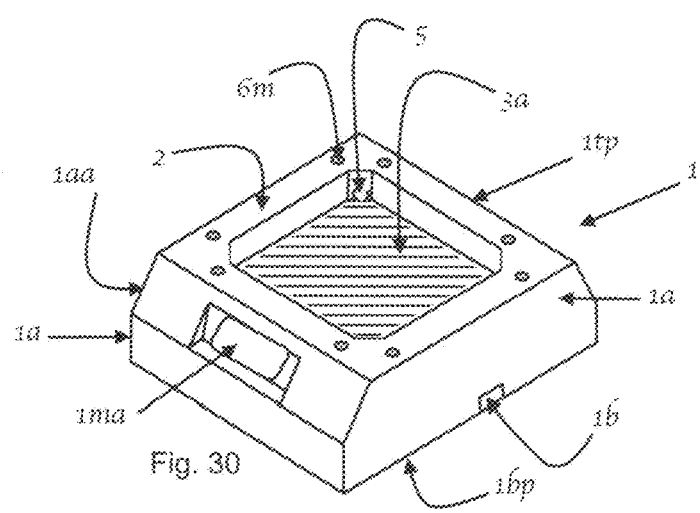
FIG. 30 is a perspective view of the support block according to the invention complete with identification marking area.

Referring now to a preferred support block 1 of the present invention there is provided a generally square or rectangular support block 1 (FIG. 30) having a (bottom) base perimeter 1*bp* with four sides that extend upward to a (top) top rest 2 which forms a perimeter around a void or lowered interior center 3*a* area. The sides may be formed as perpendicular sides 1*a*, angular sides 1*aa* or a combination of both perpendicular sides 1*a* and angular sides 1*aa* that may have marking or identification areas 1*ma* formed within any perpendicular side 1*a* or angular side 1*aa*.

Where the support block 1 is not formed with a raised upper perimeter or top rest 2 the top could be a generally flat surface 2*fs* where metal elongated channel 6*i*, u-channel or similar could be used to for elevating a conduit 6 off the generally flat surface 2*fs* (FIG. 27, 28, 29). The metal elongated channel 6*i* could be placed at any location on the generally flat surface 2*fs* to elevate a conduit 6.

Figure 19:
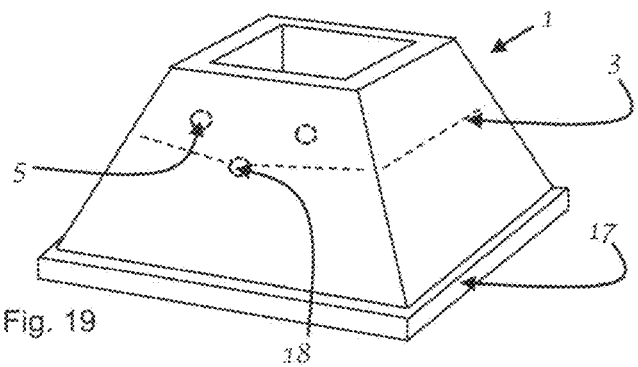
FIG. 19 is a perspective view of a support block according to the invention in the shape of a square pyramid with a bottom lip and solid interior base with drainage holes.
Figure 19A:
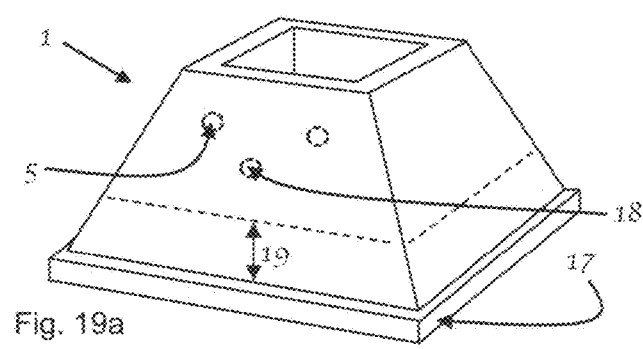
FIG. 19a is a perspective view of a support block according to the invention in the shape of a square pyramid where the bottom section of the sides is recessed.

The base perimeter 1*bp* is intended to be placed on a surface which can include a roof 20. The base perimeter 1*bp* may be equal in measurement to the top perimeter 1*tp* where the sides 1*a* are perpendicular illustrated in FIG. 1. However, the base perimeter 1*bp* might be larger than the top perimeter 1*tp* where the perpendicular sides 1*a* are no longer perpendicular and have angle sides 1*aa* that are angled to some degree. In this angled sided support block 1 the angular sides 1*aa* beginning at the base perimeter 1*bp* or other location on a perpendicular side 1*a* extend upward to the top perimeter 1*tp*. The base perimeter 1*bp* of a support block 1 as mentioned is well suited for flat and gradually sloped roofs 20 due in part to the foot print of the base perimeter 1*bp* which is used to displace the point of contact pressure that the roof 20 encounters. This reduction of contact pressure provides a conduit support or support block 1 that will not damage roof 20 surfaces and prevents vibration. Furthermore, the base perimeter 1*bp* can be bonded directly to roof surfaces at the bottom lip 17 (FIG. 19, 19*a*).

Figure 13:
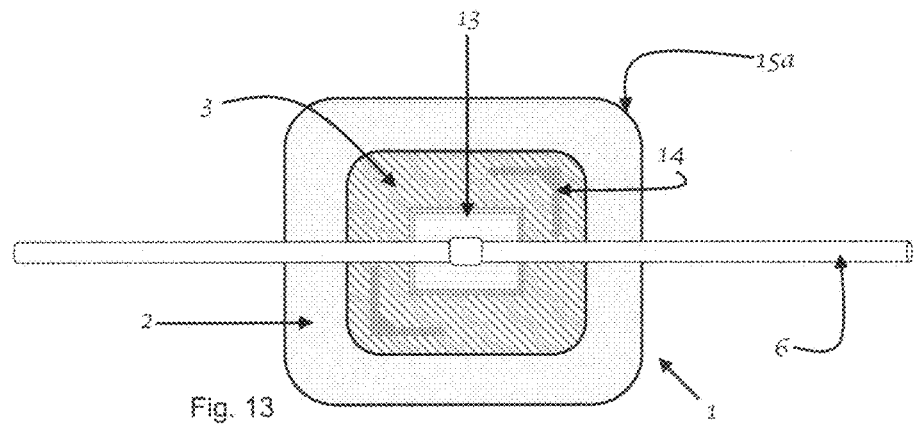
FIG. 13 is a plan view of a support block according to the invention which includes supporting a conduit attached with a coupling.

For design elements, wind effects, material saving, shipping, aligning or other reasons the side corners 15 of the support block 1 could have rounded sides 15*a* (FIG. 13) or be angular 15*b* (FIG. 14,15,16) creating an octagon or similar shaped base perimeter 1*bp* or top perimeter 1*tp*. It is to be understood that shape is not intended to be limiting of the scope of the invention, as such, the shape of the support block 1 could be other geometrical shapes or forms or geometrical shapes. The shape of the base perimeter 1*bp* and top perimeter 1*tp* of the support block 1 could be square, circular, oval, rectangular an octagon or combinations of such shapes which provide support for a conduit 6 at one or more points. The interior center 3*a* of the support block 1 may be void of material or hollow or formed with a lower area or interior base 3. The interior base 3 depth is dependent upon factors such as the component 8 above the interior base 3 or lighting supported by the interior base 3, or other factors such as the size of conduit 6 supported by the support block 1.

Other shaped embodiments not illustrated are not intended to show lack of novelty, however with limitations for illustration the reader is to understand that the scope cannot be defined only by shape of the support block 1. The intent is that the support block 1 is to provide support of a conduit 6 at one or more locations on a single support. In addition, the support block 1 provides at the top rest 2 area close proximity support near or at a component 7 providing support and protecting for the conduit 6, component 7 and component joints 8 from stress, breakage or other hazards. Therefore, regardless of the physical geometrical shape, conduit 6 supports that provide more than one point of conduit 6 contact or support are within the spirt of this disclosure when the purpose is to support or protect a conduit 6, a component 7 or component joint 8.

The support block 1 and components thereof the support block 1 may be fabricated of any suitable resilient materials, including plastics, rubber, composites, metals, wooden 4×4 or similar pressure treated lumber and recycled materials. The support block 1 may be fabricated using suitable techniques, including molding, casting, machining, cutting or similar to the above to achieve the results required. The support block 1 when made of rubberized material or non-conductive materials can dampen or eliminate conduit 6 harmonics or sound, provide a thermal break from heat or cold, isolate or prevent dielectric action and prevent conduit 6 and roof 20 wear.

Figure 5:
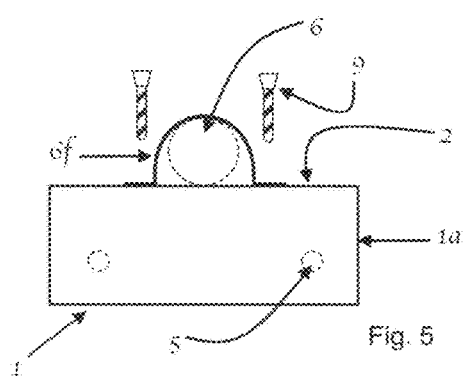
FIG. 5 is an exploded side view of the support block of FIG. 1 which includes a conduit supported on top of the support block under a hanger element.
Figure 6:
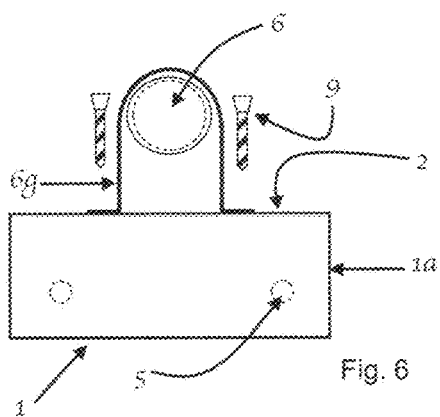
FIG. 6 is a side view of the support block of FIG. 1 which includes a conduit supported at a height above the support block.

The top rest 2 can receive a variety of external connector elements or components for the purpose of affixing a conduit 6 to a support block such as, screws 9 and clips 6*f* (FIG. 5), screws 9 and ring hangers 6*g* (FIG. 6), screws (not shown), metal elongated channel 6*i* and channel clips 6*h* (FIG. 7). The use of other connector elements including bolts (not shown), threaded rod 6L, nuts 6*k*, 6*kk* (FIG. 9) nails (not shown) epoxies (not shown) or similar connector elements known or unknown are possible means of connecting or affixing a conduit 6 to the support block 1.

Figure 1:
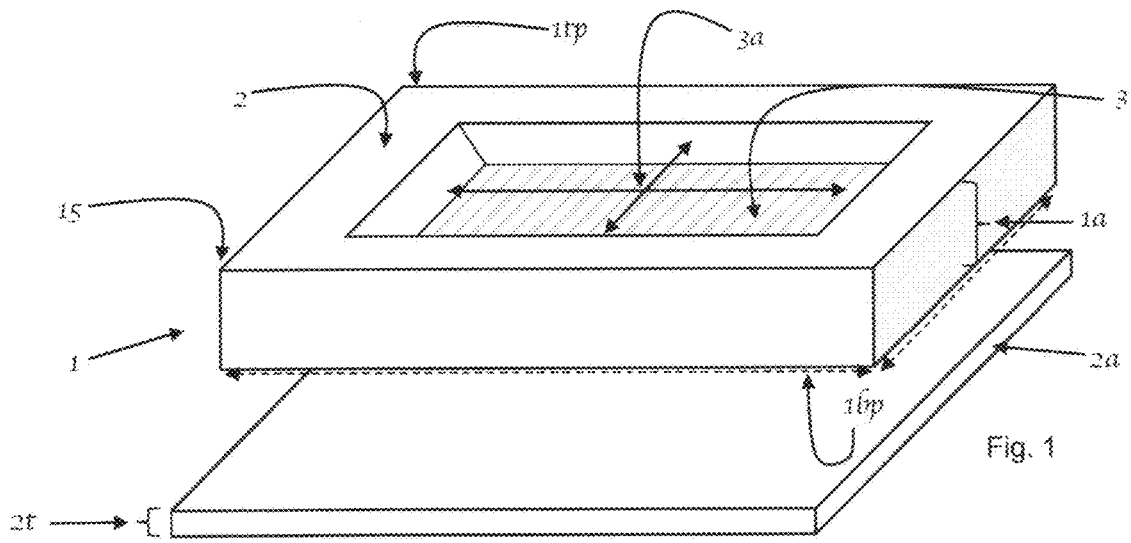
FIG. 1 is a perspective exploded view of a conduit support according to the invention including a support block and a half plate.
Figure 1A:
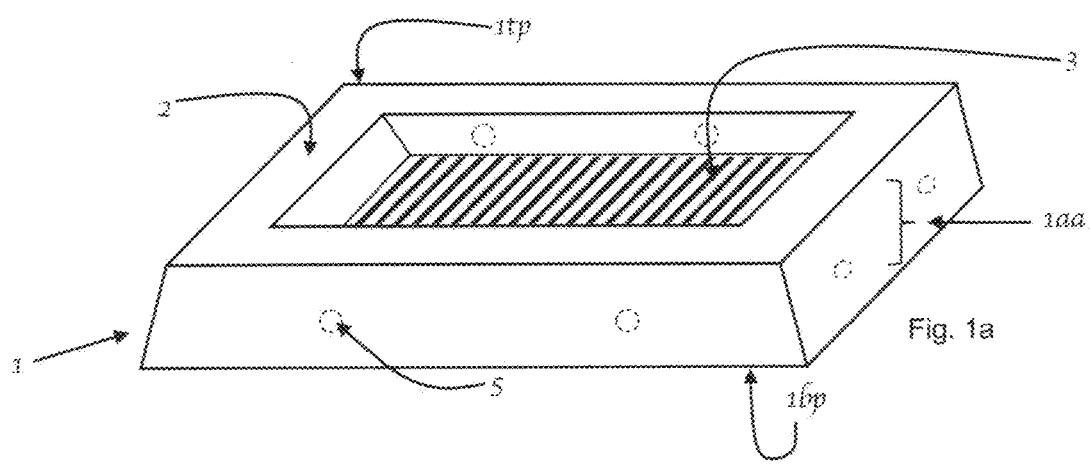
FIG. 1a is perspective view of the support block of FIG. 1 which is modified to provide sloped sides.

In some aspects of conduit 6 supporting, conduit grade or slope is required. As illustrated in FIG. 1 the height of the support block 1 can be adjusted with the use of half plates 2*a*. The half plates 2*a* are intended to be placed directly under a conduit support, other supporting embodiment (not shown) or a support block 1. Height adjustments are created by adding one or more half plate 2*a* to the underside of the support block 1, conduit support, other supporting embodiment (not shown). A typical slope or grade could be a quarter inch per foot of conduit run and if placed at four foot increments it could be assumed the thickness 2*t* of a single half plate 2*a* could be 1 inch. Additionally, a half plate 2*a* can function as a load distribution pad 2*d* (FIG. 1*b*), vibration isolation pad or temperature barrier.

Figure 9:
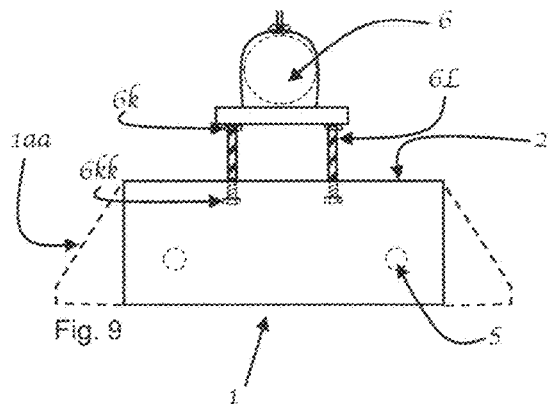
FIG. 9 is a side view of the support block of FIG. 1 which includes a conduit supported above the support block by threaded rod.

The above described means of providing grade, slope or height to a conduit 6 can also be provided with the use of conventional bolts (not shown) or nuts 6*k*, 6*kk* and threaded rod 6L cut to the required length where the conduit 6 is elevated above the support block 1 and supported by elongated channel 6*j* (FIG. 9, 27, 29).

Figure 1B:
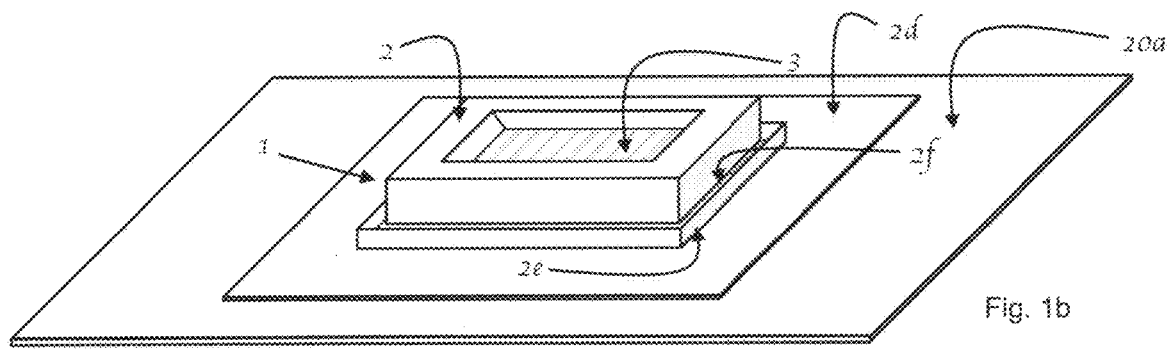
FIG. 1b is perspective view illustrating the support block of FIG. 1 which includes a load distribution pad.

FIG. 1*b* illustrates a load distribution pad 2*d* which can be placed on a roof 20 surface such as, but not limited to, synthetic rubber (EPDM), polyvinyl chloride (PVC) or thermoplastic polyolefin (TPO) roof membranes 20*a*. The load distribution pad 2*d* provides an additional layer of protection for a roof membrane 20*a* and/or provides a method to secure and align a conduit support, other supporting embodiment (not shown) or a support block 1. The load distribution pad 2*d* can be made of exact or complementary materials as the roof membrane 20*a* which can be placed directly on a roof membrane 20*a* or be bonded to the roof membrane 20*a* completely or partially. Partial bonding of the load distribution pad 2*d* to the roof membrane 20*a* could allow the load distribution pad 2*d* to become dislodged without causing damages to the roof membrane 20*a* if stress was imposed on either the roof membrane 20*a* or load distribution pad 2*d*. With the load distribution pad 2*d* in place a conduit support, other supporting embodiment (not shown) or a support block 1 can be place on or within the load distribution pad 2*d*. The load distribution pad 2*d* may have stay ridges 2*e* that allow a conduit support, other supporting embodiment (not shown) or a support block 1 to expand and contract or move freely without damaging the roof membrane 20*a* while held within the confines of the stay ridges 2*e*. Perforations could be expected within a stay ridge 2*e* to allow for water drainage, air movement or similar. If so desired side attachments are possible through the stay ridges 2*e* into a conduit support, other supporting embodiment (not shown) or a support block 1. The gap 2*f* between the conduit support, other supporting embodiment (not shown) or a support block 1 and stay ridges 2*e* may also be filled with epoxies, silicone or similar. The thickness 2*t* of a load distribution pad 2*d* could be less than that of the half plate 2*a*.

Both the half plate 2*a* and load distribution pads 2*d* could be easily covered or partially covered by the roof membrane 20*a* securing either to a roof 20 surface, however, the use of screws, bolts, epoxies or similar would be expected if so desired by the installer.

Figure 2:
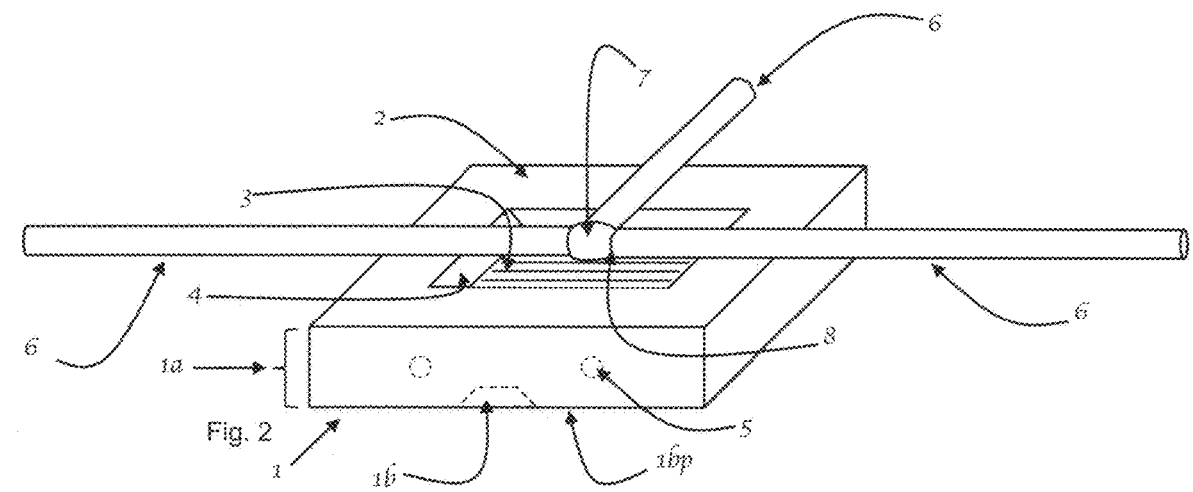
FIG. 2 is a perspective view of the support block of FIG. 1 which includes a tee fitting centered in the middle of the support block with all conduit ends supported on the top of the support block.
Figure 3:
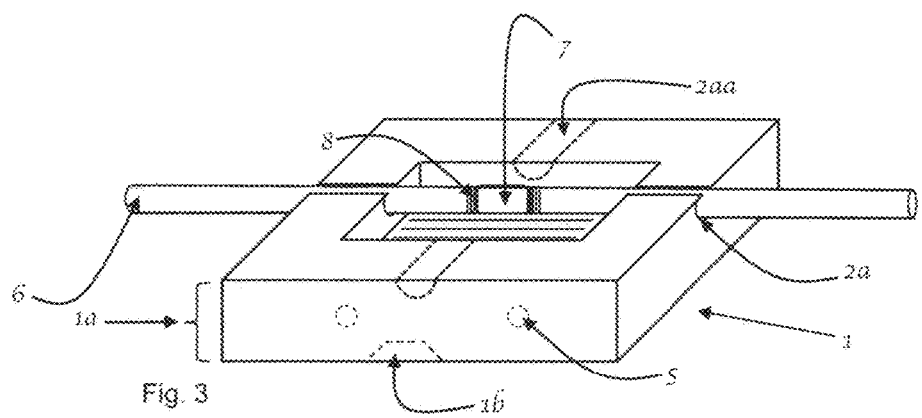
FIG. 3 is a perspective view of the support block of FIG. 1 which includes a coupling centered in the middle of the support block with two conduit ends supported on the top of the support block.

FIG. 2 illustrates the invention or support block 1 supporting conduits 6 on the top rest 2 at three locations. As explained, supporting conduit 6 ends removes stress and load bearing factors which could damage or break conduit joints 8. The perpendicular sides 1*a* or angular sides 1*aa* of the support block 1 extend upward some distance greater than the height of the interior base 3 providing a void or interior center 3*a* within the support block 1 thus creating more than one location for a conduit 6 to be supported by the support block 1.

The support block 1 interior center 3*a* is generally centered within the support block 1 providing an inspection and air circulation area around a component 7, conduit 6 and component joint 8. The interior center 3*a* may also function as an operational area for components 7 that move, such as a valve or an area for a technician, maintenance or installation person to perform work on or install a component 7. Additionally, the interior center 3*a* can also provide an open area for lighting 13 (FIG. 11, 12, 13) which can be attached to the interior base 3.

Figure 16:
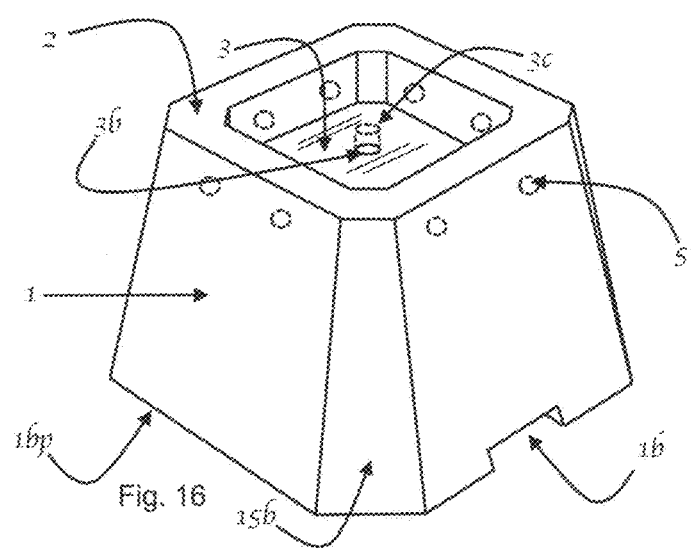
FIG. 16 is a perspective view of a support block according to the invention in the shape of a square pyramid with angled corners having a channel through the base.

The base or base perimeter 1*bp* in contact with a surface may in some aspects have channels 1*b* (FIG. 16, 17, 30) for air circulation acting as a cooling vent, drain area or slot for corrugated roofing materials to extend upward into. The support block 1 can have conduit 6 secondary holes 5 extend though the support block 1 providing an alternative path for other conduits 6 to be routed or these secondary holes 5 can function as vents or drains. Additional conduit 6 routing can also be present of the angular sides 1*aa* at conduit 6 side saddle 1*c* of FIG. 4.

Figure 8:
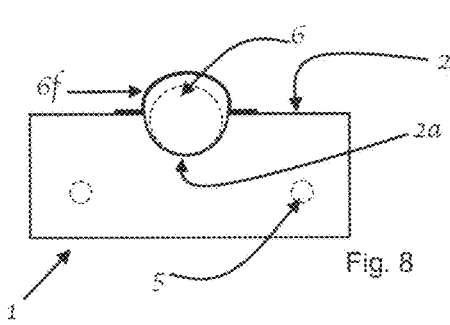
FIG. 8 is a side view of the support block of FIG. 1 which includes a conduit supported within the support block at a height below a top surface of the support block.

Other arrangements of a support block 1 FIG. 8 illustrate the conduits 6 positioned within the top rest 2 at saddles 2*a* allowing the conduit 6 to be partially inserted or completely flush with the top rest 2.

As shown in FIGS. 4 through FIG. 10*a* a conduit 6 can be attached and supported in a variety of different methods from conduit 6 placement on the top rest 2 to where the conduit 6 is placed partially or entirety into the top rest 2.

Figure 10:
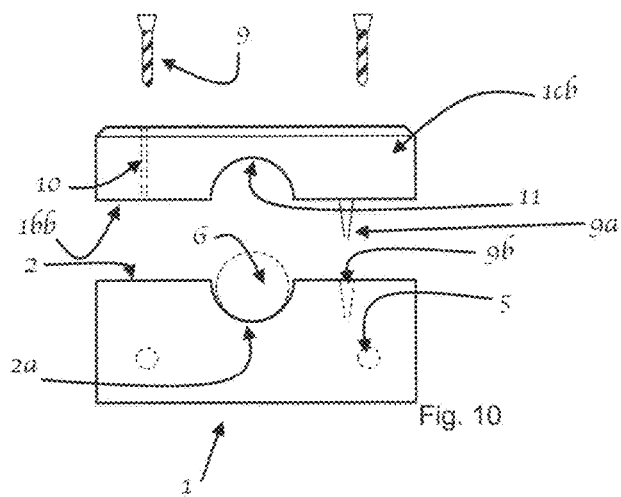
FIG. 10 is an exploded side view of the support block of FIG. 1 which includes a conduit supported within the support block and further including a cover.
Figure 10A:
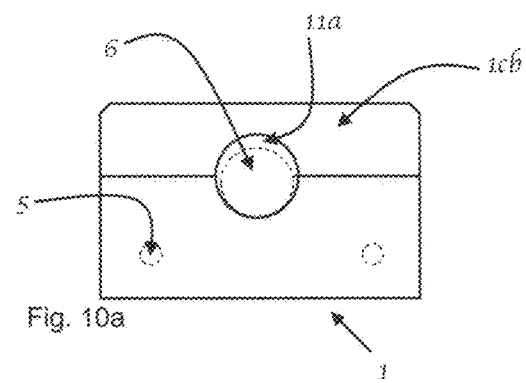
FIG. 10a is a side view of the support block of FIG. 10 which includes with a conduit supported within the support block with the cover attached to the support block.

FIG. 10 provides illustration of a cover 1*cb* which is placed over the conduit 6 which is received in FIG. 10*a* to the top rest 2 with the use of conventional connector elements including screws 9, bolts (not shown) or threaded rod (not shown) or similar. As an option to conventional connector elements a push pin 9*a* can be formed as part of the cover 1*cb*. The push pin 9*a* can be inserted into push holes 9*b* of the support block 1 and held by friction. The push pin 9*a* cover attachment is provided as a seismic release where physical attachment to a structural object could be compromised by extreme movement or fatigue of the attached object.

The cover 1*cb* Illustrated in FIG. 10*a* may be formed in a manner that allows for expansion and contraction of a conduit 6 with expansion void 11*a* (FIG. 10*a*).

Optional to conventional connector elements such as screws 9 and bolts (not shown) glues, epoxies or similar (not shown) may be applied to the cover underside 1*bb* and/or top rest 2.

Figure 11:
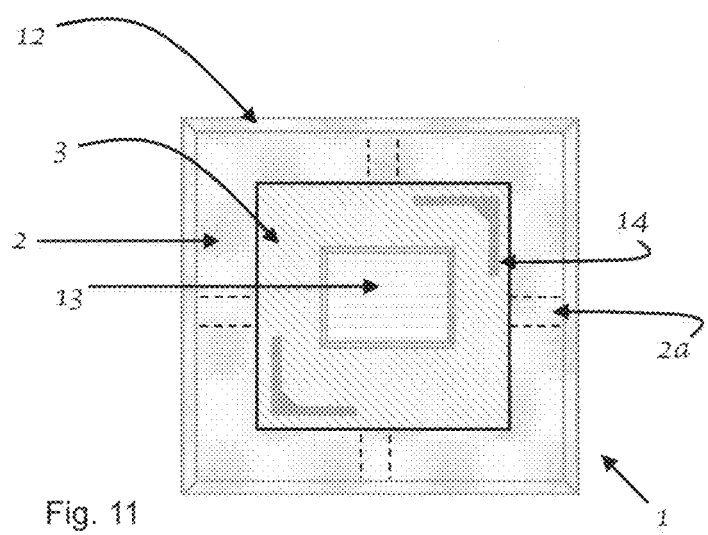
FIG. 11 is a plan view of the support block of FIG. 1 which includes lighting.

The support block 1 of FIG. 11 illustrates a light 13 positioned within the support block 1 on the interior base 3 and expansion attachment channels 14. The expansion attachment channels 14 can also act as drainage areas for the interior base 3 and an area for connector elements (not shown) to secure the support block 1 to a surface on which the support block 1 is placed.

Figure 12:
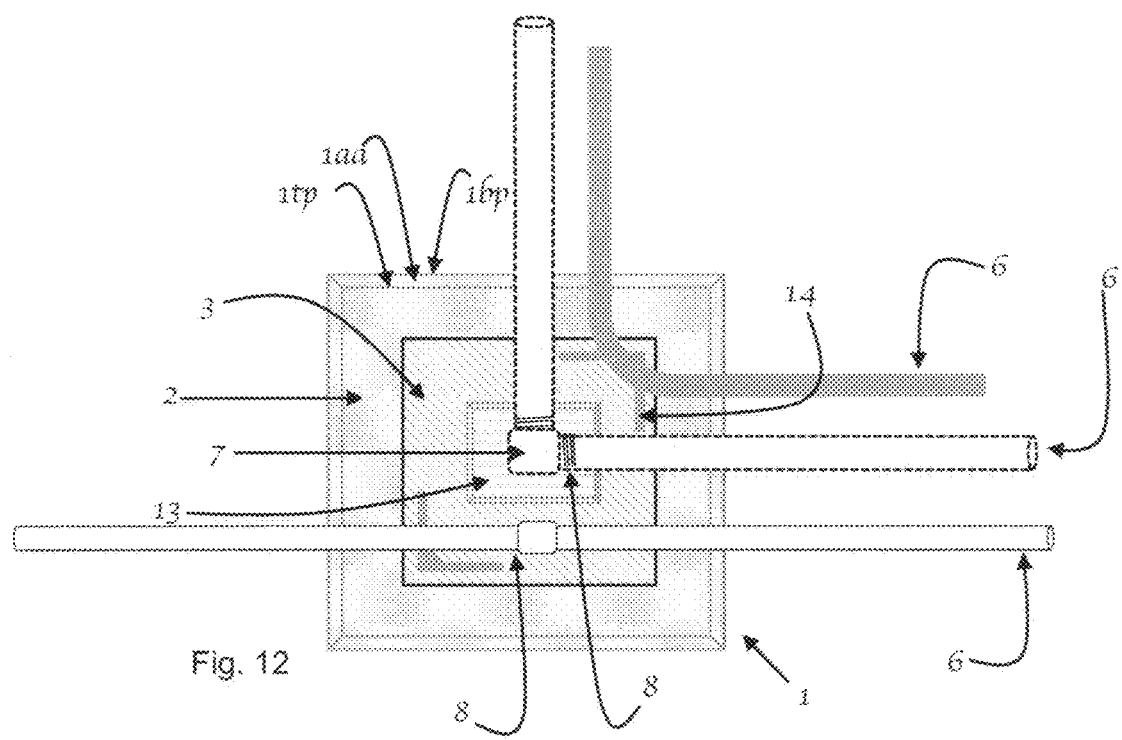
FIG. 12 is a plan view of the support block of FIG. 1 which includes supporting conduits at more than one location.

FIG. 12. Illustrates in plan view three different conduits 6 being supported on a single support block 1.

Figure 14:
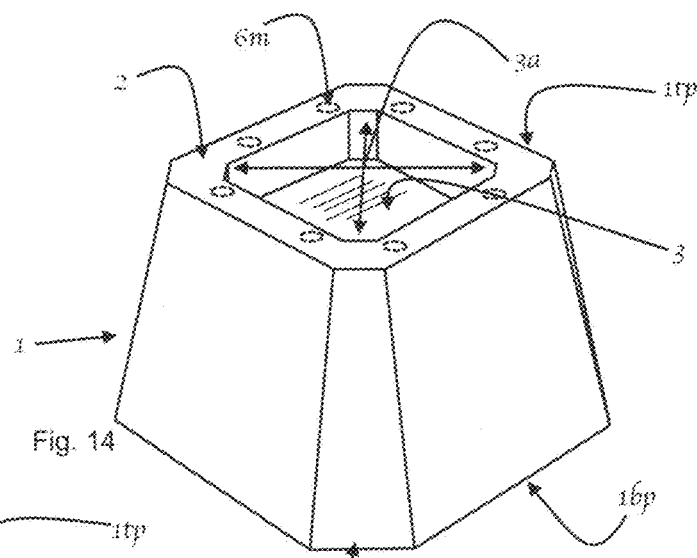
FIG. 14 is a perspective view of the support block according to the invention which includes in the shape of a square pyramid with angled corners.

FIG. 14 is a support block 1 in the shape of a square pyramid with rod holes 6*m* at the top rest 2 with a hex shaped nut recess (not shown) on the underside of the top rest 2. The rod hole 6*m* which extends though the top rest 2 can receive a connector element such as a bolt (not shown) or threaded rod 6L (FIG. 9) which is received by a nut 6*kk* (FIG. 9) on the underside of the top rest 2. The nut 6*kk* is held in place within the nut recess allowing connector elements to be fitted through the rod hole 6*m* and threaded into the nut 6*kk*. The nut recess prevents the nut 6*kk* from rotating as connector elements are tightened.

Figure 15:
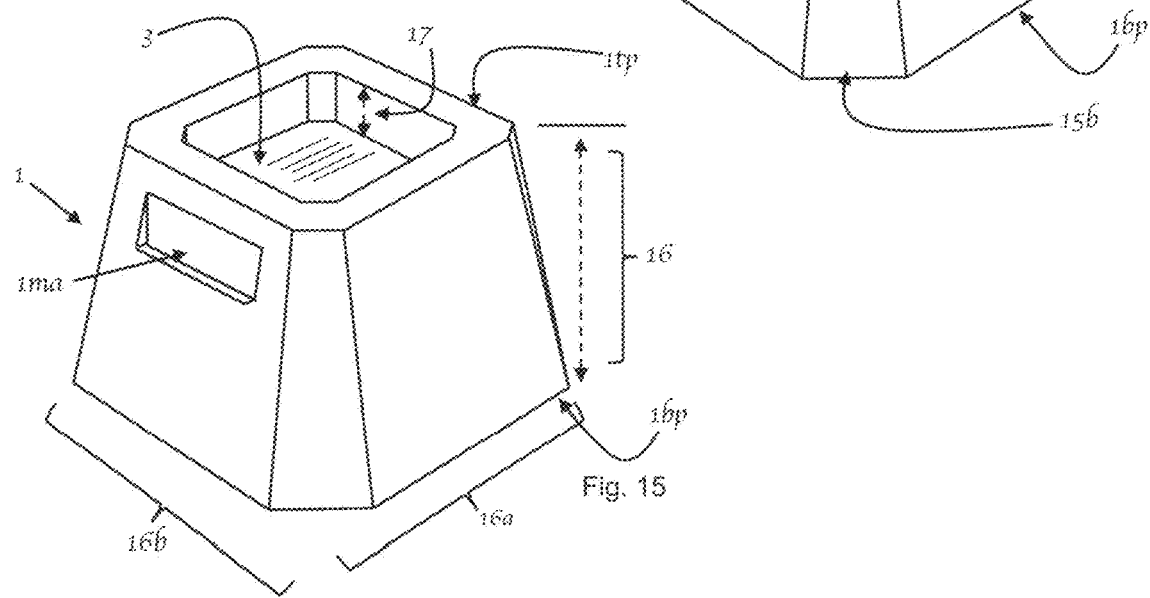
FIG. 15 is a perspective view of the support block according to the invention in the shape of a square pyramid with angled corners.

The length 16*a* and width 16*b* illustrated in FIG. 15 are depended upon the size of conduits 6 being supported which could be 12 inches by 12 inches and the height 16 is anticipated to provide a minimum of 3 inches from the top perimeter 1*tp* to the surface the base perimeter 1*bp* is placed. However, the height 16 is dependent upon outside influence such as codes or standards which may require a conduit 6 to be supported at minimum heights, as such, the height 16 may change as needed. The depth 17 of the interior base 3 when provided is dependent upon the particular component 7 that is situated above the interior base 3, however a 1 inch depth could be anticipated as a minimum. The interior base 3 may have drainage holes 3*b* (FIG. 16) to allow moisture or water to drain from interior center 3*a* or to allow air to circulate. Additionally, the drainage hole 3*b* could be used for a conduit to pass through into the roof below, in which case, the drainage hole 3*c* would be elevated off the interior base 3 and sealed with a water tight sealant and a secondary drainage hole 18 (FIG. 19, 19*a*) would be provided on an angular side 1*aa*.

Figure 17:
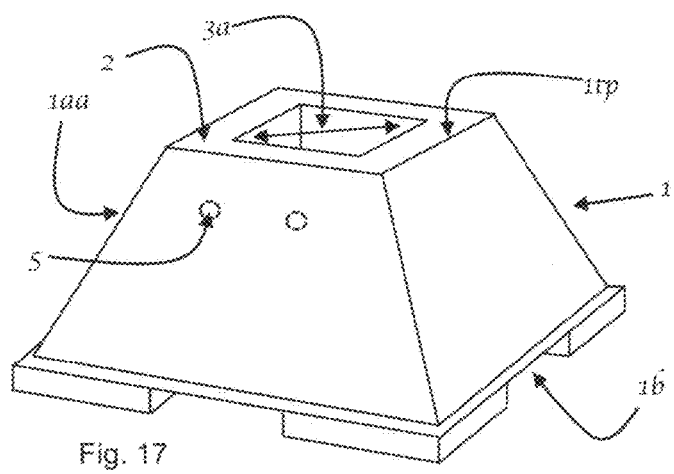
FIG. 17 is a perspective view of a support block according to the invention in the shape of a square pyramid with four sides.

In support blocks 1 illustrated in FIG. 17 no interior base 3 is provided and the interior center 3*a* is void of material.

FIG. 17, 18, 19, 19*a* illustrate a support block 1 with four angular sides 1*aa* where the corners are straight, without the angular corners 15*b* illustrated in FIG. 14, 15, 16.

Figure 18:
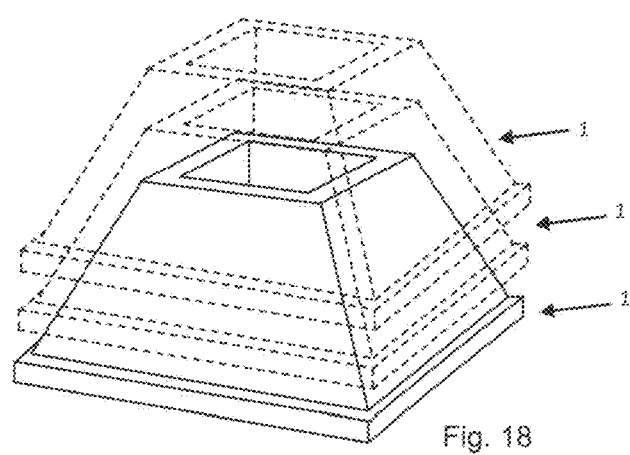
FIG. 18 is a perspective view of a support block according to the invention in the shape of a square pyramid illustrating stacking support blocks.

For the purpose of transportation support blocks 1 may be stacked one on top of the other as illustrated in FIG. 18.

As shown in FIG. 17,18,19 and FIG. 19*a* a bottom lip 17 located at the base perimeter 1*bp* which has a perimeter larger than the base perimeter can be used as a flange for attachment purposes. Attachment methods included conventional screws, bolts or similar. Additionally, the bottom lip 17 could be bonded to a roof membrane 20*a* where overlapping 19 of a roof membrane 20*a* onto a support block 1 is possible.

Figure 20:
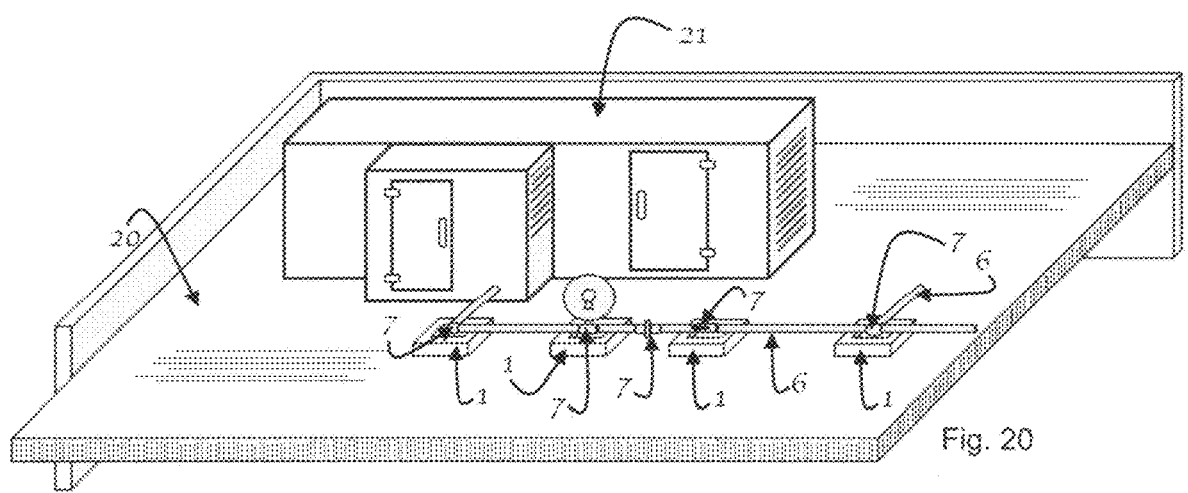
FIG. 20 is a perspective view illustrating a gas heating roof top unit according to the invention on a partial building roof segment with the gas supply conduits supported at all the conduit ends and where the components are centered of the conduit support of this disclosure.

FIG. 20 Illustrates multiple support blocks 1 as described throughout this disclosure installed on a roof 20 of a building. The support blocks 1 are spaced to distribute the load bearing force of the conduit 6 illustrated as a gas line with components 7 that include a 90-degree elbow, a regulator, union, manual valve, and tee fitting from left to right from a Gas Heating Roof Top Unit 21. The illustration shows with the use of this invention or support block 1 all the conduit 6 ends or joints 8 are supported with equal respect. For areas of multiple close components 7 such as the union between a regulator and manual valve, two support blocks 1 could support six conduit 6 ends or joints 8.

Figure 26:
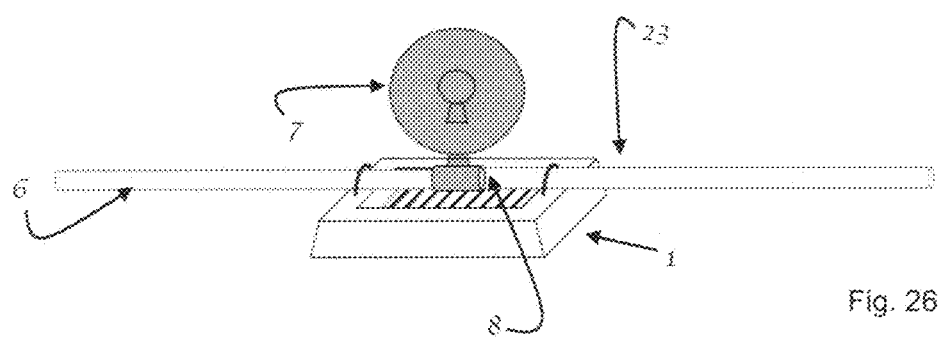
FIG. 26 is a perspective view illustrating a support block according to the invention without damage.

As disclosed within this writing conduit 6 ends and all joints 8 of a conduit 6 system require support and when left unsupported, damage including leaking, stressed and broken joints 8 create hazards. It is well known that when force 23 such as foot traffic, snow loads, conduit 6 weight or similar is imposed on a conduit 6 end which is not supported damage will be incurred. Illustrated in FIG. 25 prior art supports 22 are shown not providing support at critical areas of a conduit 6 system resulting in a broken joint 8. However, as illustrated in FIG. 26 when force 23 is imposed on the conduit 6 the joint 8 and conduit 6 supported by this invention or support block 1 remains without damage.

The present invention has been illustrated and described with reference to particular embodiments thereof, it will be understood by those skilled in the art that other changes in form and detail may be made and are to be considered within the scope and essence of the present invention.

The invention claimed is:

1. A method for installing a conduit system on a support surface comprising:

providing a plurality of conduit components;
connecting together the conduit components using at least one coupling component connecting an end of one conduit component to an end of another conduit component;
the conduit components being connected to define a conduit plane at a lowermost surface of each of the conduit components;
the coupling component defining a coupling plane at a lowermost surface of the coupling component at a height below the conduit plane;
and supporting the conduit components at the coupling component with a single conduit support block;
wherein the support block includes support surface portions in said conduit plane supporting said conduit components and surrounding the coupling component;
wherein the support block includes at least one recessed area recessed from said support surface portions into which the coupling component is received:
wherein the support surface portions surround the recessed area;
and supporting each of the plurality of the conduit components on a respective one of the support surface portions in a manner without clamping of the conduit component on the respective support surface portion so as to allow expansion and contraction sliding movement of the conduit component along its length relative to the respective support surface portion;
the coupling component being supported above the recessed area and inwardly of the support surface portions so that the coupling component is free to move relative to the support block in response to movement of the conduit components;
and maintaining a base of the support block in stationary position on the support surface.

2. The method according to claim 1 wherein the conduit support block comprises a resilient body to dampen or eliminate conduit harmonics or sound.

3. The method according to claim 1 wherein the conduit support block provides two or more first surfaces of contact on a single support block where the conduit system is supported and/or affixed in one or more locations on the single conduit support.

4. The method according to claim 1 wherein the support block provides the conduit system with protection of the coupling component from stress, strain or breakage.

5. The method according to claim 1 wherein the conduit support block is a square or rectangular in plan.

6. The method according to claim 1 wherein the support block is circular, triangular or hexagon shapes.

7. The method according to claim 1 wherein the support block includes a flat top where a bottom perimeter is larger in diameter than a top perimeter.

8. The method according to claim 1 wherein the support block is made of non-metallic elastomeric, rubber or plastic material.

9. The method according to claim 1 wherein the support block is made of recycled material.

10. The method according to claim 1 wherein the support block has an area arranged for marking or labelling, or lighting areas.

11. The method according to claim 1 wherein the support block has holes penetrating or passing directly through the support block where other conduits or electrical wiring can be fed or inserted through.

12. The method according to claim 1 wherein the four support surface portions include recessed conduit attachment areas.

13. The method according to claim 1 wherein the support block is arranged to equally distribute weight loads thus adapted to support light, medium and heavy loads with equal respect.

14. The method according to claim 1 wherein support block is formed of durable and resilient material.

15. The method according to claim 1 wherein the base of the support block provides a footprint for load distribution on the support surface so that of the support block is suited for installation on any one of synthetic rubber EPDM, polyvinyl chloride PVC, thermoplastic polyolefin TPO, metal, asphalt, tar and roof surfaces covered in rocks.

16. The method according to claim 1 wherein the base of the support block includes channels or passages which prevent temperature transfer from the conduit components to the support surface or vice versa.

17. The method according to claim 16 wherein the channels or passages also allow watershed preventing standing water, condensate or similar at the support block.

18. The method according to claim 1 wherein the a base of the support block has a base lower lip which allows a roof membrane to be overlapped preventing water penetration through the roof membrane.

19. The method according to claim 18 wherein a water tight seal is provided at the base lower lip when overlapped with the roof membrane.

20. The method according to claim 18 wherein the lower lip of the base has holes or placement markings for connector elements to be used to affix the support block to the support surface.

21. The method according to claim 20 wherein the support block is provided with connector element holes which are countersunk from the support surface portions to allow for a smooth surface for the roof membrane to be laid flush.

22. The method according to claim 1 wherein-the recessed area include a second surface recessed from said support surface portions.

23. The method according to claim 1 wherein there are provided water discharge holes extending from the recessed area to a position exterior to the support surface portions.

24. The method according to claim 1 wherein an underside of the support block is recessed to allow stacking of a plurality of the support blocks one on top of another.

25. The method according to claim 1 wherein there is provided a cover mounted on the support block and covering over the conduit components and the coupling components.

26. The method according to claim 1 wherein there are provided attachment brackets arranged to fasten the conduit components on the support surface portions.

27. A method for installing a conduit system on a support surface comprising:
providing a plurality of conduit components;
connecting together the conduit components using at least one coupling component connecting an end of one conduit component to an end of another conduit component;
the conduit components being connected to define a conduit plane at a lowermost surface of each of the conduit components;
the coupling component defining a coupling plane at a lowermost surface of the coupling component at a height below the conduit plane;
and supporting the conduit components at the coupling component with a single conduit support block;

wherein the support block includes support surface portions in said conduit plane supporting said conduit components and surrounding the coupling component;

wherein the support block has a recessed area recessed from said support surface portions into which the coupling component is received;

wherein the support surface portions surround the recessed area;

and supporting each of the plurality of the conduit components on a respective one of the support surface portions in a manner without clamping of the conduit component on the respective support surface portion so as to allow expansion sliding movement of the conduit component along its length relative to the respective support surface portion;

the coupling component being supported within the recessed area and inwardly of the support surface portions so that the coupling component is free to move relative to the support block in response to movement of the conduit components;

maintaining a base of the support block in stationary position on the support surface; and wherein there are provided water discharge holes extending from the recessed area to the support surface outside the support block.

\* \* \* \* \*